Figure 1:
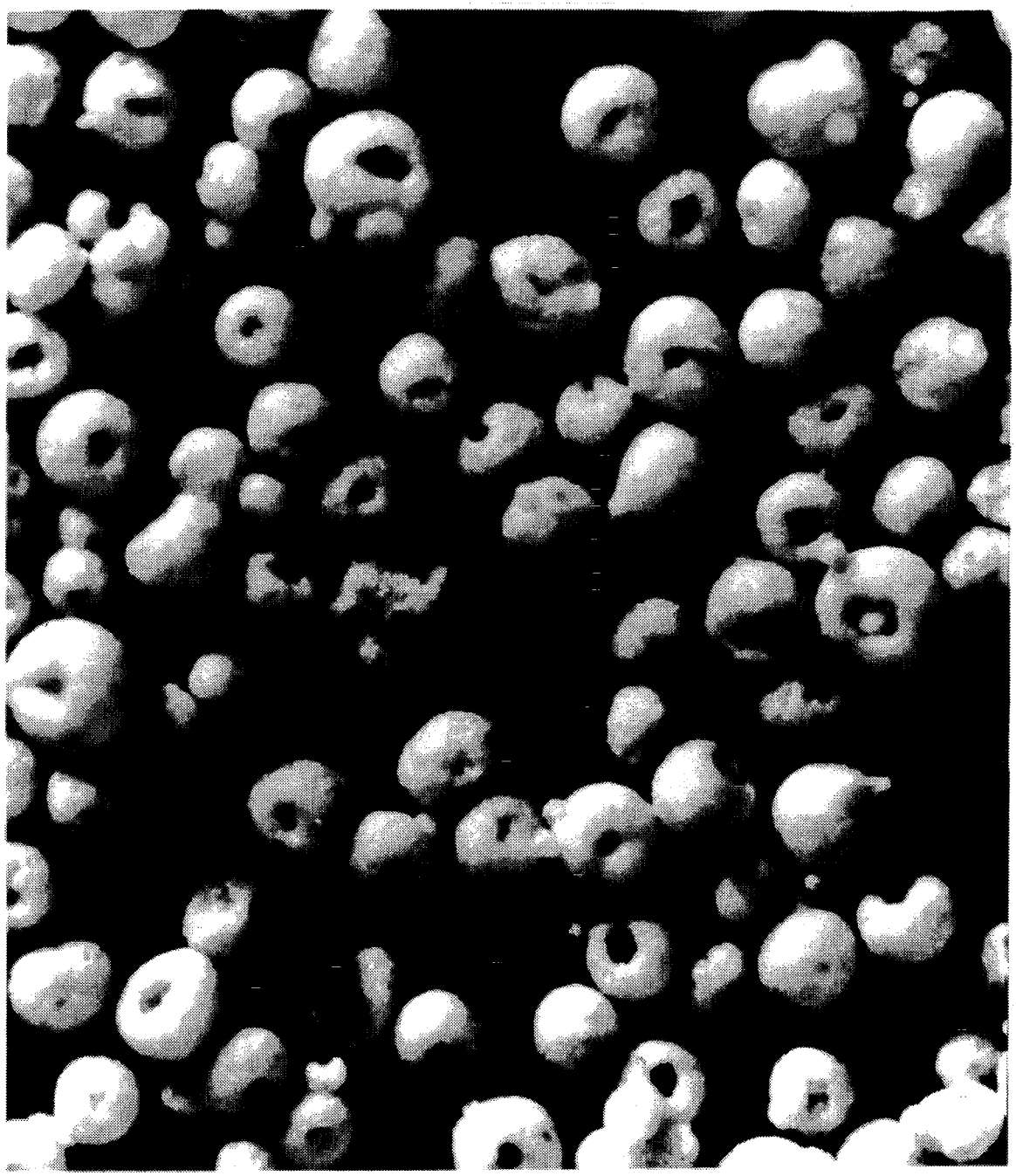

United States Patent [19]
Cohen et al.

[11] Patent Number: 5,493,821
[45] Date of Patent: Feb. 27, 1996

[54] ADSORBENT FOR USE IN DOUBLE GLAZED WINDOWS

[75] Inventors: Alan P. Cohen, New Fairfield, Conn.; Thomas J. Dangieri, Carmel, N.Y.; Philip Connolly, Danbury, Conn.

[73] Assignee: UOP, Des Plaines, Ill.

[21] Appl. No.: 237,738

[22] Filed: May 4, 1994

[51] Int. Cl.$^6$ .................. E06B 7/00; E06B 3/24
[52] U.S. Cl. .................. 52/171.3; 52/172; 52/788.1; 428/34
[58] Field of Search .................. 52/171.3, 172, 52/788, 204.6; 502/407, 414, 527; 428/34

[56] References Cited

U.S. PATENT DOCUMENTS

| | | | |
|---|---|---|---|
| 3,868,299 | 2/1975 | Ulisch et al. | 161/162 |
| 4,141,186 | 2/1979 | Schoofs | 52/172 |
| 4,144,196 | 3/1979 | Schoofs | 252/455 |
| 4,151,690 | 5/1979 | Schoofs | 52/172 |
| 4,476,169 | 10/1984 | Nishino et al. | 428/34 |
| 4,564,540 | 1/1986 | Davies et al. | 428/34 |
| 4,818,508 | 4/1989 | Flank et al. | 423/328 |
| 4,946,814 | 8/1990 | Shi et al. | 502/62 |
| 5,132,260 | 7/1992 | Plee | 502/64 |

OTHER PUBLICATIONS

Masters, K., *Spray Drying Handbook*, 5th Edition, John Wiley & Sons, Inc., New York, 1991, pp. 37–39, 333–336 & 346–348.

*Primary Examiner*—Kenneth J. Dorner
*Assistant Examiner*—Kien T. Nguyen
*Attorney, Agent, or Firm*—Thomas K. McBride; John G. Tolomei; Richard P. Silverman

[57] ABSTRACT

Novel, hollow, low-density agglomerates for use in sealed insulating glass windows to adsorb water vapor, and optionally organic materials, present in the cavity between the two adsorbents when used to fill all portions of the spacer tube located at the peripheral sides of the double glazed unit, thereby greatly facilitating the filling of such spacer robes and the fabrication of the overall unit.

13 Claims, 2 Drawing Sheets

1

ADSORBENT FOR USE IN DOUBLE GLAZED WINDOWS

FIELD OF INVENTION

The present invention relates in general to adsorbent compositions and more particularly to zeolite-containing adsorbent bodies suitable for use in insulating glass windows. In general, these adsorbent bodies comprise a bonded agglomerate of zeolite. These agglomerates are characterized as cenospheres having a relatively low bulk density.

BACKGROUND OF THE INVENTION

Multiple-layer insulating glass windows and similar units comprise at least two parallel panes of glass spaced apart to create an insulating air space between the panes. Usually the parallel panes are sealed around their periphery with an aluminum spacer tube to form an integrated structure having no communication between an internal cavity between the panes and the outside atmosphere. In the fabrication procedure, at the time the panes are sealed to the spacer tube, ambient air containing water vapor is entrapped in the internal cavity and, depending upon the particular sealant employed, organic species emanating from the sealant, such as solvent vapors and low molecular weight polymers, can also be present. Condensate of these vapors tends to collect on the inner surfaces of the sealed glass panes and to create a visual and/or aesthetic impairment which cannot be remedied except by extreme measures. For example, U.S. Pat. No. 4,144,196 to Schoofs discloses an improvement in sealed insulating glass windows by disposing an adsorbent about all or part of the interior periphery of the glass. The improvement lies in employing a molecular sieve zeolite, such as zeolite A, that permits adsorption of water vapor and prevents adsorption of nitrogen and oxygen as the adsorbent. U.S. Pat. No. 4,151,690 discloses that the adsorbent preferred for water adsorption is zeolite X.

U.S. Pat. No. 3,868,299 to Ulisch discloses the use of an adsorbent designed for use in multiple layer insulating glass windows comprising a narrow-pore zeolite in combination with a wide-pore adsorbent and, optionally, a clay binder. Ulisch discloses that narrow-pore zeolites include sodium zeolite A, and wide-pore adsorbents include faujasite (zeolite X and Y), active carbon, silica gel, aluminum oxide and mixtures thereof. Kaolin, attapulgite, bentonite, waterglass, gellable silica sols and mixtures thereof are disclosed as suitable binders. Ulisch discloses that the adsorbent materials are prepared by methods known in the art as oil dropping, wherein a suspension of the adsorbent materials is stirred with an aqueous stable silica sol to form a free-flowing suspension which is subsequently introduced to a liquid immiscible with water to form droplets of the required size. The bead granulates formed are removed from the liquid as completely homogeneous bead granulates. The bead granulates are screened, dried, and dehydrated in hot air at about 350° C. Bead granulates produced in this manner represent the most common beads for use in insulating glass windows and, typically, have bulk densities ranging from about 0.640 gm/cc (40 lbs/cf) to about 0.960 gm/cc (60 lbs/cf) and range in size from about 10 to about 40 mesh.

Others such as U.S. Pat. No. 5,132,260 to Plee disclose the preparation of adsorbents for use in multi-pane windows by making a paste from the zeolite powder, a silica gel and a sodium aluminate solution and mechanically shaping the adsorbent at room temperature, followed by heat treating at 50°–100° C. and calcination at 450°–600° C. The resulting zeolite agglomerate has superior water adsorption and mechanical strength.

U.S. Pat. No. 4,476,169 relates to an adsorbent material for multilayer glazing wherein an adsorbent in the spacers consists of a granular zeolite having a core of synthetic zeolite with a clay binder having more zeolite than the particle as a whole, and a shell of synthetic zeolite with a clay binder, wherein the shell has more clay than in the particle as a whole, and particles of activated carbon coated with synthetic latex.

As in essentially all adsorption procedures, it is the current practice of manufacturers of adsorbent agglomerates for use in dual-pane windows to maximize the adsorbent capacity of each agglomerate. Thus, the filling of substantially all portions of spacer tubing with currently available adsorbents for use in windows results most often in the significant overuse of expensive adsorbent.

A number of seemingly simple and obvious solutions to the excessive adsorbent problem may suggest themselves. For example, decreasing the size of the spacer tube would decrease the quantity of adsorbent necessary to fill it. The basic functions of the spacer tube, however, are to control the spacing of the panes and provide the structure and the surfaces for sealing the panes to form an integrated unit. A decrease in spacer size would have an adverse effect upon at least one of these functions. It is, however, necessary that any portion of the spacer tube which contains adsorbent particles be substantially completely filled in order that the particles do not move and abrade each other during handling, transportation, and installation with the consequent production of dust in the internal cavity of the window.

Another approach which would decrease the amount of adsorbent and the cost is to employ an inexpensive diluent. The apparent logic of incorporating an inexpensive inert diluent into the adsorbent agglomerate ceases to be compelling when it is realized that there are no known diluents which are both inexpensive and have no substantial adverse effect upon the manufacture of the adsorbent particle. The function of the adsorbent agglomerate as an adsorbent with diluents such as wood, flour, or walnut shells, assuming they are sufficiently inexpensive, cannot tolerate the calcination procedures necessary for activation of the zeolite constituent. Inorganic diluents such as clays, aluminas and silicas have been proposed and actually used in prior an window desiccants. These materials are not at all inexpensive and, in fact, may even exceed the costs of certain zeolites. It is, moreover, of great importance that the diluent be capable of being incorporated into a desiccant particle in a manner which does not adversely affect the adsorbent properties of the zeolite constituent, i.e., binder-blinding, pore-clogging, and the like, and not cream dusting problems or contribute to a lack of strength of the overall desiccant particle.

Methods were sought to expand the agglomerate to fill the entire spacer tube without adding additional costly zeolite adsorbent. Spray drying of the adsorbent agglomerate appeared to have the potential to decrease the bulk density of the adsorbent, but most of the art of spray drying of zeolites or clay was directed to the production of attrition resistant, concentrated particles. For example, in general, spray-drying involves the atomization of a suspension of material with drying air to form droplets. As soon as the droplets come into contact with the drying air, evaporation takes place from the outside surface of the droplets. According to K. Masters in *Spray Drying Handbook*, 5th Edition, John Wiley & Sons, Inc., 1991, pages 37–39 and 333–336 and 346–348, evaporation takes place in two stages. It the first stage, evaporation continues at the surface, while diffusion of moisture from within the droplet replenishes the moisture lost from the surface. This constant rate stage continues until the moisture content becomes too low to maintain the saturated condition at the surface. At this point, a dried shell forms at the droplet surface. Evaporation now continues at the rate of moisture diffusion through the dried surface shell. The thickness of the dried shell increases with time, causing the rate of evaporation to decrease resulting in the falling rate period of drying.

During evaporation, the spray distribution of the material within a spray droplet undergoes change. Different materials exhibit different evaporation characteristics which result in different types of particles. Some particles tend to expand, others collapse, fracture or disintegrate, leading to porous, irregularly shaped particles. The tendency for the formation of hollow particles by spray drying is described in Masters, ibid., pages 347–348, as a function of four mechanisms relating to (1) the expansion of the droplet with increasing temperature, (2) rapid evaporation rates at the interior of the droplet, (3) capillary action induced flow of liquid from the center of the droplet, and (4) entrainment of air.

U.S. Pat. No. 4,946,814 to Shi et al. discloses a process for significantly improving the physical and catalytic properties of the faujasite containing fluid cracking catalysts employing a sol binder by incorporating acid stable surfactants into the catalyst component slurry prior to spray drying to eliminate the "blow hole" and fragile shell character of the particles to produce stronger, more dense particles. Shi et al. is representative of the spray drying an which taught the empty particles with blow hole are to be avoided.

SUMMARY OF THE INVENTION

The present invention provides an improved adsorbent for use in insulating glass windows. Insulating glass windows generally comprise two parallel glass panes separated by a spacer and forming an interior space which is sealed, and along one or two sides contains an adsorbent selective for the adsorption of water and solvents. The typical adsorbent used as a window desiccant is expensive and additional manufacturing steps are required to provide the adsorbent along only a portion of the periphery of the interior space. By using the adsorbent of the present invention, which is characterized as a cenosphere having a low bulk density and a low concentration of zeolite, an economical solution to the problem of loading adsorbent in insulating glass windows is provided. Using the adsorbent of the present invention it is now economical to employ the adsorbent substantially throughout the spacer tube around the periphery of the window and, in fact, add the adsorbent during the time the spacer is formed. Disposing the adsorbent substantially throughout the spacer tube means that the spacer tube is preferably at least 80 percent filled, and more preferably the spacer tube is at least 90 percent filled with adsorbent. The additional properties of the adsorbent of the present invention include a low thermal conductivity to minimize heat transfer between the enclosed space between the window panes and the window frame, and a low attrition rate to minimize the dusting, improve the flow properties and provide sufficient structural strength during the insulating glass window fabrication process. The hollow spheroid shape and low concentration of zeolite greatly simplify the loading of adsorbent material into the double glazed window unit by providing minimum structural resistance to the forming and bending of the window spacer.

In one embodiment the invention relates to a adsorbent for use in an insulating glass window which prevents the condensation of water and/or solvents therein. The window has two parallel panes of glass spaced apart to provide an enclosed space between the panes. The enclosed space has a periphery. An adsorbent, disposed on the periphery, comprises a molecular sieve zeolite and a binder wherein the improvement comprises forming the molecular sieve zeolite and the binder into cenospheres and disposing the cenospheres substantially throughout all of the periphery of the enclosed space.

In another embodiment the invention relates to an insulating glass window comprising at least two parallel panes of glass spaced apart to provide an enclosed space therein between and wherein the enclosed space has a periphery. A tube, having an interior space is disposed about the periphery of the enclosed space. The robe has a plurality of perforations to permit the interior space to be in fluid communication with the enclosed space of the window. A spray-dried adsorbent is disposed substantially throughout all of the interior space of the tube to prevent the condensation of water and/or solvent on said parallel panes of glass.

In a further embodiment the invention relates to a closed spacer for an insulating glass window having two parallel panes of glass to provide an enclosed space. The panes have a periphery. The spacer comprises a tube with two opposed parallel sides, an interior surface and an interior space defined by the opposed parallel sides and the interior surface. The interior surface has a plurality of holes disposed thereon. The interior space is substantially filled with an adsorbent. The adsorbent comprises cenospheres having a low bulk density whereby the tube can be formed to the periphery without deforming the opposed parallel sides of the tube.

In a still further embodiment the invention relates to an adsorbent for use in an insulating glass window comprising a binder having a rod morphology and a molecular sieve zeolite wherein the binder and the molecular sieve zeolite are combined to form a cenosphere particle having a low bulk density.

BRIEF DESCRIPTION OF THE DRAWINGS

FIG. 1 is a photograph showing the morphology or structure of the zeolite-based adsorbent of the present invention.

FIG. 2 is a fragment of a double glazed window showing one corner of the double glazed window expanded.

DETAILED DESCRIPTION OF THE INVENTION

The problem solved by this invention was to provide an adsorbent agglomerate which contains a sufficient amount of an adsorbent such as a zeolitic molecular sieve and a binder such as a clay binder which could be used in multiple pane windows. Typically, based on an analysis of the amount of zeolite required to remove water, solvent and other volatile organic material from an insulating glass window, it was determined that only one or two sides of the window need to be filled with adsorbent. However, the filing of only one or two sides of the window required special manufacturing procedures to weld or fasten spacer tubes filled with adsorbent to empty tubes or spacer elements to complete the construction of the windows. It was desired to be able to economically fill substantially the entire spacer tube with an adsorbent agglomerate having the same amount of zeolite required to prevent condensation, as was typically loaded in one or two sides of the window.

The adsorbent or adsorbents employed in insulating glass windows can be any of the naturally occurring or synthetically produced adsorbents which will selectively, on the basis of molecular size, adsorb water without adsorbing oxygen or nitrogen. Typically, zeolite A, zeolite X, and mixtures thereof have been used in insulating glass windows to prevent condensation. More particularly, zeolite 3A, 4A, and 13X are preferred zeolite materials.

Zeolitic molecular sieves in the calcined form may be represented by the general formula;

where Me is a cation, x has a value from about 2 to infinity, and n is the cation valence. Typical well-known zeolites which may be used include chabazite, also referred to as Zeolite D, clinoptilolite, chabazite, erionite, faujasite, also referred to as Zeolite X and Zeolite Y, ferrierite, mordenite, Zeolite A, Zeolite Omega, Zeolite rho, Zeolite Beta, Boggsite, and silicalite. Detailed descriptions of some of the above identified zeolites may be found in D. W. Breck, *ZEOLITE MOLECULAR SIEVES*, John Wiley and Sons, New York, 1974, and are hereby incorporated by reference.

It is often desirable when using crystalline molecular sieves that the molecular sieve be agglomerated with a binder in order to ensure that the adsorbent will have suitable particle size and strength. Them are a variety of synthetic and naturally occurring binder materials available such as metal oxides, clays, silicas, aluminas, silica-aluminas, silica-zirconias, silica-thorias, silica-berylias, silica-titanias, silica-alumina-thorias, silica-alumina-zirconias, mixtures of these and the like, clay binders such as attapulgite, kaolin, volclay, halloysite, sepiolite, palygorskite, kaolinite, bentonite, montmorillonite, illite, and mixtures thereof may be employed. Clay binders selected from the group consisting of attapulgite, kaolin, volclay, halloysite, and mixtures thereof are preferred. Attapulgite and halloysite are more preferred for use as a binder with the zeolite adsorbent material.

Agglomerate formation techniques employed for insulating glass windows has focused on producing a concentrated agglomerate which would meet the minimum standard set by the Insulating Glass Certification Council or other certifying agency. The minimum standard was established that the amount of desiccant per linear foot of edge be greater than or equal to the amount used in prototype tests which were based on filling one to four sides of a hollow window spacer of fixed size and perimeter. Typically, the standard size spacer is about 0.63 cm (0.25 inch) wide by about 0.63 cm (0.25 inch) deep and the prototype window is about 35.6 cm (14 inches) by 50.8 cm (20 inches).

Although spray drying techniques had been employed in the manufacture of catalysts incorporating molecular sieve zeolite and binders, it was unacceptable to produce catalyst particles which had low bulk densities and with fragile structures such as cenospheres. However, it was surprisingly found that when the zeolite molecular sieve and a suitable binder was formed into an agglomerate with a low density and with sufficient attrition resistance, spray drying could be employed. Agglomerates produced from a binder with a rod-like morphology, or mixtures of binders with a predominant rod-like component resulted in the production of the low density adsorbent of the present invention.

It was found that a spray dried adsorbent agglomerate comprising a zeolitic molecular sieve and a clay binder could be used as a desiccant in insulating glass windows when the adsorbent was disposed throughout the periphery of the insulated window. It was discovered that spray drying the adsorbent mixture to provide a cenosphere, or hollow spheroid with a blow-hole resulted in the production of an adsorbent having a very low bulk density. Preferably, the average bulk density of the adsorbent particles will be less than 0.64 gm/cc (40 lbs/cf), and more preferably, the average bulk density of the adsorbent particles will be less than about 0.50 gm/cc (31 lbs/cf). Preferably, the range of the average bulk density of the spray-dried adsorbent particles will range from about 0.64 gm/cc (40 lbs/el) to about 0.32 gm/cc (20 lbs/cf). Preferably, the diameter of the cenosphere will range from about 10 to about 200 mesh, and more preferably the diameter of the particles will range from about 20 to about 100 mesh. It is believed that in the formation the adsorbent of the present invention, the liquid flow to the surface of the particle by capillary action, leaving a void at the center of the droplet is the controlling factor in the production of the cenosphere shape of the adsorbent. In addition to the cenosphere formation, a majority of the adsorbent particles were found to contain a blow-hole on the surface of the particle.

FIG. 1 is a photograph of the adsorbent which has been magnified about 200 times to show the shape of the adsorbent particles of the present invention. All of the particles were screened to about 20×100 mesh, appeared to have a blow-hole and a hollow or shell structure. This structure is often referred to as a cenosphere, or empty sphere.

The adsorbent found to be preferred for use in insulating glass windows was prepared by combining 3A zeolite with various binders in an aqueous slurry and spray-drying the slurry to form the adsorbent particles. It is believed that the selection of the composition of the slurry and the water content were critical to the formation of the low density, cenosphere of the present invention. Spray dried particles, according to the present invention, have average bulk densities, lower than adsorbent particles produced by other means. The composition which provided an adsorbent agglomerate with low dusting and low density comprised 3A zeolite and at least 20% attapulgite or halloysite clay. Mixtures of attapulgite clay with other clays such as kaolin and kaolin like clays also resulted in the production of the low average bulk density adsorbent agglomerate. Attapulgite and halloysite clay particles resemble rods or fibers and it is believed that the fibrous nature of the attapulgite and halloysite clays leads to the formation of a zeolite/clay felt during the spray-drying process which resists deformation at the low shear rates experienced in the spray-drying process and results in the production of the cenospheres of the present invention. Although kaolin clays have a hexagonal morphology, in combination with the fibrous clays, kaolin clays can be incorporated into the production of the low density particles.

Figure 2:
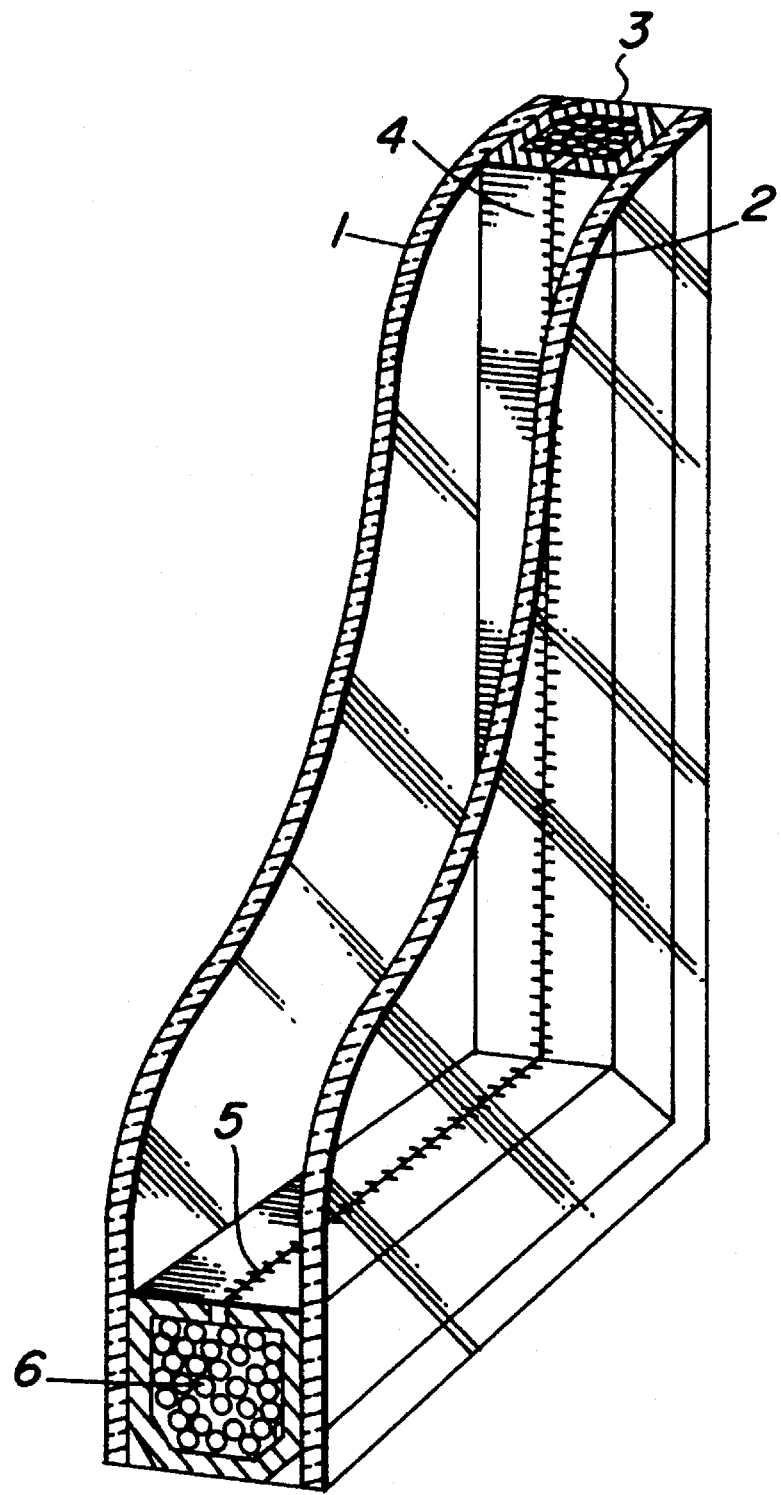

FIG. 2 shows one corner of a double glazed window expanded. Referring to FIG. 2, 1 and 2 indicate two panes of glass of the double glazed window held together in a spaced relationship by a sealing resin 3 and spacer tubes 4. The spacer tubes 4 lie inside the space enclosed by the sealing resin 3 and along the periphery of the sides of the window. The closure of the spacer tube is indicated at 5 where the tube is closed sufficiently to prevent the escape of adsorbent particles 6 disposed in the interior of the spacer tubes.

The adsorbent of the present invention does not have a measurable crash strength, but it has sufficient attrition resistance to be disposed in the spacer tube of an insulating glass window during the forming process. Typically, the spacer robe is a closed, generally rectangularly-shaped robe having two parallel sides, an interior surface, and an interior space. The interior surface has a plurality of holes or slits which are drilled or formed in the interior surface to permit the gas or air in the enclosed space between the panes of glass to come into contact with the interior space of the spacer tube without allowing an adsorbent disposed within the spacer robe to enter the enclosed space. The general structure of the insulating glass window and the spacer tube are illustrated in U.S. Pat. Nos. 4,141,186 and 4,564,540, the general content of which are hereby incorporated by reference. The interior space of the spacer tube according to the present invention is substantially filled with adsorbent prior to the forming or bending of the spacer tube to conform to the periphery of the glass panes of the window. It was discovered that the cenospheres of the present invention, unlike conventional high density agglomerates did not deform the spacer robe during the bending and forming of the spacer tube, thus providing a simplified manufacturing process for the insulating glass windows.

EXAMPLES

The invention will be further clarified by a consideration of the following examples, which are intended to be purely exemplary of the use of the invention.

EXAMPLE I

A slurry of 3A molecular sieve zeolite was prepared for spray-drying in the following manner. At room temperature, 100 grams of clay dispersant, comprising a 40% polymeric sodium carboxylate solution containing about 8% sodium, was dissolved in about 2450 gm of water. About 451 grams of attapulgite clay mineral was added to the water/dispersant mixture and the solution was agitated with a high shear mixer until the clay was dispersed evenly in the mixture forming a clay slurry. About 1315 grams of zeolite 3A powder was added to the clay slurry while the agitation of the slurry continued to produce a slurry which contained about 30% solids. In some slurry preparations, an additional amount of up to 20% weight of zeolite 3A powder, or fines, comprising about 70% 3A zeolite and about 30% binder, the binder selected from attapulgite clay or kaolin clay and mixtures thereof, was added to the slurry following the addition of the 3A zeolite powder.

The slurry was then charged to a Bower Tower dryer. The dryer has a diameter of 76 cm (30 inches) and was about 2.7 meters (9 feet) high, including the core section. The dryer inlet temperature of the dry air was adjusted to between 399° C. and 454° C., and the slurry was passed to a 6×6 nozzle at a rate of about 15.1 to about 20.8 dm³/h (4 to 5.5 gal/hr) to atomize the slurry to provide a fluid velocity of 1.02 m/s (200 ft/min) to about 1.5 m/s (300 ft/min) and air/liquid mass ratio of between 0.3 to 0.7. The air pressure at the nozzle was between 150 kPa (22 psia) and 193 Kpa (28 psia). The resulting spray dried particles were calcined in air at a temperature of about 450°–650° C. in the conventional manner.

EXAMPLE II

A series of samples of spray-dried particles were prepared according to procedure of Example I with attapulgite and kaolin binder. The results of these preparations and the resulting average bulk density of the spray-dried particles is shown in Table 1. In the samples shown, the dispersant level was maintained at 2.0 wt. %, except for samples A and B which were at 0.8 wt. %. The samples prepared with the attapulgite clay binder resulted in the production of a spray-dried agglomerate with a low bulk density. The densities for the attapulgite mixtures ranged from about 0.41 g/cc to about 0.48 g/cc compared to agglomerates prepared with the kaolin clay binder. The kaolin agglomerates, C and D, had bulk densities ranging from about 0.61 to about 0.65 gm/cc. The difference in the bulk density may be explained by the morphological difference between the attapulgite and the kaolin clay. The kaolin clay has a hexagonal plate morphology which resists deformation at low shear rates found in spray drying and thus kaolin may not form the felt-like structure of the attapulgite clay with the zeolite which resulted in the formation of the low density cenospheres of the present invention. The halloysite clay morphology is similar to that of the attapulgite clay, and the low density of the K sample of 0.46 gm/cc supports this observation. It was found that a minimum of at least 20 wt. % of a clay with a rod-like morphology such as attapulgite or halloysite was required to achieve the cenosphere structure with a low bulk density.

TABLE 1

SPRAY-DRIED ADSORBENT PARTICLE COMPOSITION AND DENSITY

| Sample | Binder Type | wt % | Fines wt % | Slurry Solids wt % | Bulk Density g/cc |
| --- | --- | --- | --- | --- | --- |
| A | Attapulgite | 20 | 0 | 30 | .418 |
| B | Attapulgite | 20 | 0 | 25 | .410 |
| C | Kaolin | 50 | 0 | 43 | .647 |
| D | Kaolin | 40 | 0 | 56 | .612 |
| E | Attapulgite | 23 | 10 | 34 | .442 |
| F | Attapulgite | 23 | 10 | 37.5 | .462 |
| G | Attapulgite | 23 | 10 | 37.0 | .458 |
| H | Attapulgite | 30 | 20 | 35.0 | .473 |
| I | Attapulgite | 30 | 10 | 34 | .452 |
| J | Attapulgite | 40 | 10 | 33 | .455 |
| K | Halloysite | 25 | 0 | 33.9 | .460 |

EXAMPLE III

The slurry preparation procedure of Example I was modified to include the step of mixing a second binder prior to the addition of the zeolite powder to the clay slurry mixture. Table 2 shows the results of these combined binder agglomerates and the effect on the average bulk density of the spray-dried adsorbent. Combinations of adsorbents with two binders wherein the binders included kaolin, attapulgite, and volclay were prepared. Only sample CC, the 40% attapulgite with 23% kaolin resulted in a low-density spray-dried particle. In all cases, 10 wt. % of zeolite 3A adsorbent powder was incorporated into the slurry prior to the spray drying step. It appears that there may be a threshold mount of attapulgite-like clay with a rod-like morphology required other clay species are present in order to obtain the low-density spray-dried product.

TABLE 2

ADSORPBENT AGGLOMERATES
WITH BINDER MIXTURES

| Sample | Binder 1 Type | wt % | Binder 2 Type | wt % | Fines wt % | Slurry Solids wt % | Bulk Density g/cc |
|---|---|---|---|---|---|---|---|
| AA | Kaolin | 53 | Volclay | 10 | 10 | 35 | 0.666 |
| BB | Kaolin | 48 | Attapulgite | 15 | 10 | 35 | 0.611 |
| CC | Attapulgite | 40 | Kaolin | 23 | 10 | 30 | 0.461 |
| DD | Kaolin | 38 | Volclay | 25 | 10 | 30 | 0.649 |

EXAMPLE IV

An insulating glass window, nominally 76 cm (30 inches) by 1.02 m (40 inches), having a nominal size spacer tube (about 1.27 cm [0.5 inch] wide by about 0.95 cm [0.375 inch] deep) along the perimeter was evaluated for filling with adsorbent. Table 3 contains the results of this evaluation and compares use of a typical Zeolite 3A window bead with an average bulk density of 0.75 gm/cc (45.6 lbs/cf) with the adsorbent of the present invention as shown in Table 1 of Example I. Cases 1 and 2 represent the use of a conventional window bead adsorbent with an avenge bulk density of about 0.75 gm/cc. In Case 1, the window beads are placed in 2 adjacent sides of the window, filling half the perimeter. In Case 2, the entire perimeter of the window was filled with the conventional window beads. The zeolite content of the adsorbent in Cases 1 and 2 was 80%. The relative mass of zeolite per window for cases 3 and 4 indicated that the zeolite content of the insulating glass window wherein the spacer robe was substantially filled with the adsorbent of the present invention resulted in a window unit having a zeolite content within 8 percent of the window of Case 1 which was filled only on two sides with the conventional adsorbent.

TABLE 3

RELATIVE ZEOLITE ADSORBENT USE IN
INSULATING GLASS WINDOWS

| Case Adsorbent: | 1 Conventional | 2 Conventional | 3 Table 1 Sample I | 4 Table 1 Sample J |
|---|---|---|---|---|
| Bulk Density, gm/cc | .73 | .73 | .45 | .46 |
| Fraction of Perimeter | 0.5 | 1.0 | 1.0 | 1.0 |
| Zeolite Content, wt % | 80 | 80 | 70 | 60 |
| Relative Mass Zeolite/Window | 1.0 | 2.0 | 1.08 | 0.93 |

Other embodiments of the invention will be apparent to those skilled in the an from a consideration of this specification or practice of the invention disclosed herein. It is intended that the specification and examples be considered as exemplary only, with the true scope and spirit of the invention being indicated by the following claims.

We claim:

1. In an insulating glass window which prevents the condensation of water and solvents therein, said window having two parallel panes of glass spaced apart to provide an enclosed space therein between said two parallel panes of glass, said enclosed space having a periphery and an adsorbent disposed about said periphery, said adsorbent comprising a molecular sieve zeolite and a binder, the improvement wherein said adsorbent is in the form of cenospheres having a hollow spheroidal configuration and having a maximum average bulk density of about 0.64 gm/cc (40 pounds/cubic foot).

2. The insulating glass window of claim 1 wherein the molecular sieve zeolite is selected from the group consisting of zeolite A, zeolite X, and mixtures thereof.

3. The insulating glass window of claim 1 wherein the molecular sieve zeolite comprises zeolite 3A.

4. The insulating glass window of claim 1 wherein the binder is selected from the group consisting of attapulgite, kaolin, sepiolite, halloysite, palygorskite, kaolinite, bentonite, montmorillonite, illite, volclay and mixtures thereof.

5. The insulating glass window of claim 1 wherein the binder comprises attapulgite clay.

6. The insulating glass window of claim 1 wherein the binder comprises halloysite clay.

7. The insulating glass window of claim 1 wherein the cenospheres have a diameter ranging from about 1.68 mm (10 mesh) to about 0.074 mm (200 mesh).

8. The insulating glass window of claim 1 wherein said periphery is defined by a spacer bar having an interior space, said interior space being in fluid communication with said enclosed space, and said interior spaced is filled with said adsorbent.

9. The insulating glass window of claim 8 wherein the interior space is at least 80 percent filled with said cenospheres.

10. The insulating glass window of claim 1 wherein the adsorbent has an average bulk density of less than about 0.50 gm/cc (31 pounds/cubic foot).

11. An insulating glass window comprising:
  a) at least two parallel panes of glass spaced apart to provide an enclosed space therein between two parallel panes of glass, said enclosed space having a periphery;
  b) a tube having an interior space; said tube defining the periphery of said enclosed space, said tube having a plurality of perforations to permit the interior space of said tube to be in fluid communication with said enclosed space; and
  c) an adsorbent disposed substantially throughout all of the interior space of said tube to prevent the condensation of water and solvent on said parallel panes of glass, said adsorbent being in the form of cenospheres having a hollow spheroidal configuration and having a maximum average bulk density of about 0.64 gm/cc (40 pounds/cubic foot).

12. The insulating glass window of claim 11 wherein the cenospheres range in diameter from about 0.841 mm (20 mesh) to about 0.10 mm (140 mesh).

13. The insulating glass window of claim 11 wherein the adsorbent has an average bulk density of about 0.64 to about 0.32 gm/cc.

* * * * *